July 26, 1966          G. F. ZIEGLER          3,262,363

THREE COMPONENT MICROSCOPE OBJECTIVE OF LOW POWER

Filed March 26, 1963

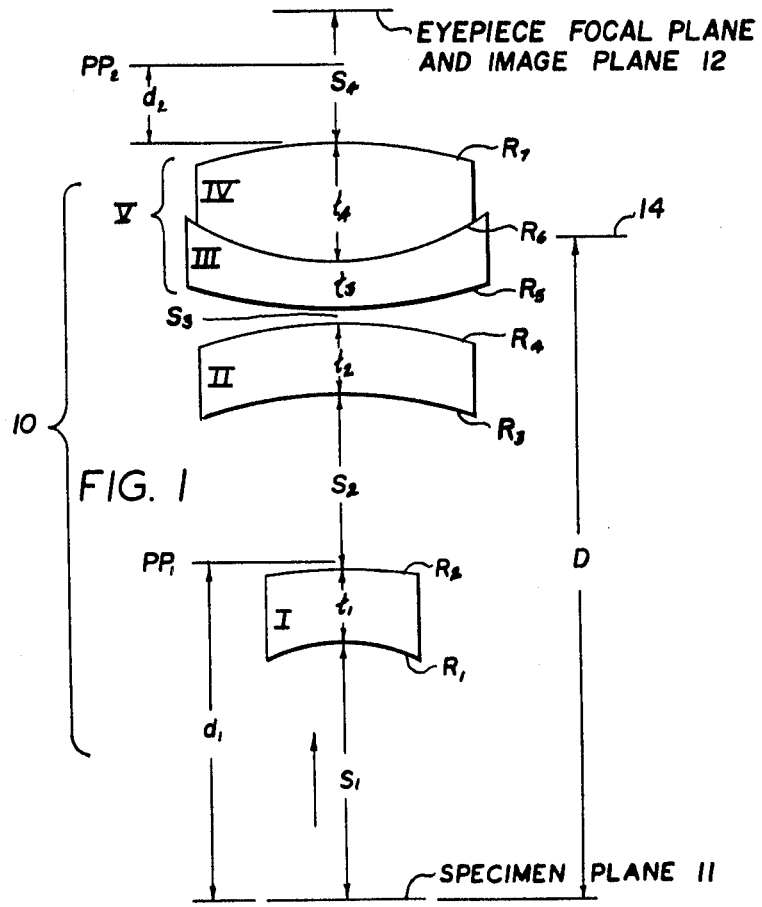

FIG. 1

| MAGNIFICATION = 3.5 ×    NUMERICAL APERTURE = .09    E.F.L. = 35.0 ||||||
|---|---|---|---|---|---|
| LENS | FOCAL LGTH. | RADII | THICKNESS | SPACES | $n_D$ | $v$ |
| I | $F_1 = -16.8971$ | $-R_1 = 6.5464$<br>$-R_2 = 30.20$ | $t_1 = 3.0$ | $S_1 = 20.03$ | 1.517 | 64.5 |
| II | $F_2 = 199.5411$ | $-R_3 = 18.030$<br>$-R_4 = 17.061$ | $t_2 = 2.8$ | $S_2 = 7.75$ | 1.720 | 29.3 |
| III | $F_3 = -29.9607$ | $R_5 = 22.909$ | $t_3 = 1.7$ | $S_3 = .375$ | 1.720 | 29.3 |
| IV | $F_4 = 13.9420$ | $R_6 = 10.765$<br>$-R_7 = 18.707$ | $t_4 = 4.5$ | $S_4 = 196.55$ | 1.517 | 64.5 |

SCALAR QUANTITIES GIVEN
IN MILLIMETERS

FIG. 2

GEORGE F. ZIEGLER
INVENTOR.

BY Frank C. Parker

ATTORNEY

United States Patent Office 3,262,363
Patented July 26, 1966

3,262,363
THREE COMPONENT MICROSCOPE OBJECTIVE OF LOW POWER
George F. Ziegler, Gates, N.Y., assignor to Bausch & Lomb Incorporated, Rochester, N.Y., a corporation of New York
Filed Mar. 26, 1963, Ser. No. 268,121
3 Claims. (Cl. 88—57)

The present invention relates to microscope objectives of low power and numerical aperture value and more particularly relates to an objective of the reversed telephoto type.

In order that the user of a microscope need not refocus his instrument after changing objectives, it is desirable that the objectives be parfocal with each other. To effect this parfocality in a series of objectives, the overall mechanical distance from the object or specimen plane to the eyepiece focal plane must be specified at the same value for each objective in the series. When this is done, and if the low power objectives are of simple form, it is found that the low power objectives are characterized by long focal lengths, and long distances from the upper or rear vertex of the objective to the object plane. But there is a mechanical limit imposed upon this distance from the upper vertex of the objective to the object plane. If this distance is too great, the objective cannot be used in the conventional revolving nosepiece. Furthermore, even if there were no difficulty with the revolving nosepiece, it is still undesirable to mount a low power objective high in the microscope tube, since it may interfere with a zoom system placed in the tube for the purpose of continuously changing the magnification over a given range.

In view of the above-mentioned constructional difficulties, it is an object of this invention to provide a microscope objective of low power and having the optical form of a reversed telephoto type of lens, said objective being in the magnification range of substantially 3.5x and having a numerical aperture of substantially .09, whereby the rear principal plane is located a considerable distance to the rear of the objective.

It is a further object to provide such a device which may be parfocalized with high power objectives in the same rotatable microscope nosepiece.

It is a still further object of this invention to provide an objective which is very well corrected for chromatic and monochromatic aberrations, distortion and flatness of field and substantially diffraction-limited in performance. It is a still another object of such a device to provide a compact construction, the cost thereof being very low by reason of the simple form of the lens parts and low-cost manufacturing operations by which they are made.

Further objects and advantages will be apparent to those skilled in the art in the details of construction described in the specification herebelow taken in connection with the accompanying drawing, wherein:

FIG. 1 is an optical diagram showing one form of the present invention; and

FIG. 2 is a chart of numerical values of the constructional data related to the optical system shown in FIG. 1.

Emphasizing the novel features of the present invention, an objective, which is generally designated by the numeral 10, is provided for forming an image of a specimen located on the specimen plane 11 at the image plane 12 located rearwardly thereof. Said objective comprises a negative meniscus front lens located nearest to the specimen plane 11 and designated by I. Spaced rearwardly thereof is a second meniscus lens which is designated II and is concave toward the specimen plate like lens I. Rearwardly spaced from and aligned with the aforesaid lenses I and II is a compound lens V, composed of a negative meniscus element III which is concave toward the image plane 12, said lens element III being in contact on its concave side with a double convex lens element IV.

The axial air space between the specimen plane 11 and lens I is designated $S_1$ and the air space between lenses I and II is designated $S_2$ while the interlens space between lenses II and III is designated $S_3$. The designation $S_4$ denotes the back focal length between the rear lens IV and image plane 12.

One of the outstanding features of this invention is the fact that the optical construction may be described as a reverse telephoto lens in which the rear principal plane $PP_2$ is displaced rearwardly from its usual position, being located at a distance $d_2$ rearwardly of the rear vertex of lens element IV.

The optical parameters of the objective are so chosen that the numerical value of the axial distance $d_1$ of plane $PP_1$ from the object plane 11 is substantially $d_1 = 1.26F$ and distance $d_2$ from the rear vertex of lens IV to the plane $PP_2$ is $d_2 = 0.89F$ where F represents the focal length of the objective.

In order to achieve the aforesaid objects of this invention as well as to procure the desired position of the principal planes, the focal lengths $-F_I$, $F_{II}$ and $F_V$ of the lenses I, II and V have values as stated in the table of mathematical statements herebelow, $$.435F < -F_I < .531F$$
$$5.120F < F_{II} < 6.26F$$
$$.661F < F_V < .809F$$

Correspondingly, the aforesaid axial distances $S_1$ to $S_4$ have values as stated in the table of mathematical statements herebelow, said table also giving values for the successive lens element thicknesses $t_1$ to $t_4$, $$.514F < S_1 < .628F$$
$$.199F < S_2 < .243F$$
$$.00966F < S_3 < .01180F$$
$$5.06F < S_4 < 6.18F$$
$$.0771F < t_1 < .0943F$$
$$.0722F < t_2 < .0882F$$
$$.0439F < t_3 < .0535F$$
$$.1157F < t_4 < .1417F$$

Furthermore, the refractive index values $n_D$ and Abbe number values $\nu$ related to the successive lenses I to IV should be as given in the chart of numerical values herebelow,

| Lenses | $n_D$ | $\nu$ |
|---|---|---|
| I | 1.512 to 1.522 | 60 to 70. |
| II | 1.715 to 1.725 | 25 to 35. |
| III | 1.715 to 1.725 | 25 to 35. |
| IV | 1.512 to 1.522 | 60 to 70. |

A still further specification of the constructional data for the objective 10 is given for the radii $R_1$ to $R_7$ of the successive lenses I to IV in the following table of mathematical statements, $$.1685F < -R_1 < .2059F$$
$$.777F < -R_2 < .949F$$
$$.464F < -R_3 < .568F$$
$$.439F < -R_4 < .537F$$
$$.588F < R_5 < .718F$$
$$.277F < R_6 < .339F$$
$$.482F < -R_7 < .590F$$

One successful form of the objective 10 is found in the table of mathematical statements herebelow, wherein the various designations for the optical parameters remain the same as heretofore, the minus (—) sign used with the R values applying to those lens surfaces which have their centers of curvature lying on the specimen plane side of the vertex of said surfaces, $-R_1 = .1872F$   $S_1 = .571F$
$-R_2 = .863F$   $S_2 = .221F$
$-R_3 = .516F$   $S_3 = .01073F$
$-R_4 = .488F$   $S_4 = 5.62F$
$R_5 = .653F$   $t_1 = .0857F$
$R_6 = .308F$   $t_2 = .0802F$
$-R_7 = .536F$   $t_3 = .0487F$
          $t_4 = .1286F$

| Lenses | $n_D$ | $\nu$ |
|---|---|---|
| I | 1.517 | 64.5 |
| II | 1.720 | 29.3 |
| III | 1.720 | 29.3 |
| IV | 1.517 | 64.5 |

A further successful example of the present invention is given in terms of numerical values in the chart of values herebelow, wherein the various designations of the optical parameters remain the same as heretofore, Magnification=3.5X. Numerical Aperture=.09. E.F.L.=35.01

| Lens | Focal Length | Radii | Thickness | Spaces | $n_D$ | $\nu$ |
|---|---|---|---|---|---|---|
| I | $F_1 = -16.8971$ | $-R_1 = 6.5464$ | $t_1 = 3.0$ | $S_1 = 20.03$ | 1.517 | 64.5 |
|  |  | $-R_2 = 30.20$ |  |  |  |  |
|  |  |  |  | $S_2 = 7.75$ |  |  |
| II | $F_2 = 199.5411$ | $-R_3 = 18.030$ | $t_2 = 2.8$ |  | 1.720 | 29.3 |
|  |  | $-R_4 = 17.061$ |  |  |  |  |
|  |  |  |  | $S_3 = .375$ |  |  |
| III | $F_3 = -29.9607$ | $R_5 = 22.909$ | $t_3 = 1.7$ |  | 1.720 | 29.3 |
| IV | $F_4 = 13.9420$ | $R_6 = 10.765$ | $t_4 = 4.5$ |  | 1.517 | 64.5 |
|  |  | $-R_7 = 18.707$ |  | $S_4 = 196.55$ |  |  |

Scalar quantities given in millimeters.

The corresponding distance between the objective shoulder 14 and the specimen plane for this particular example of objective is $D = 36.7$ substantially.

Although only one embodiment of the present invention has been shown and described in detail, other forms are possible and changes may be made in the optical parameters of the parts hereof within the limits specified without departing from the spirit of the invention as defined in the claims here appended.

I claim:

1. A microscope objective of low power reversed telephoto type having a numerical aperture of substantially .09 and being corrected for spherical and chromatic aberrations, astigmatism, coma, and field curvature, said objective comprising a negative meniscus singlet lens which is concave toward the entrant side of said objective and is designated I, a positive meniscus singlet lens designated II which is concave toward lens I and is spaced rearwardly therefrom, a positive doublet lens member spaced rearwardly from lens II and designated V, said doublet member being composed of a front convex-concavo meniscus lens designated III which is in contact with a rearward double convex lens designated IV, the radii of curvature for the successive lens surfaces of lenses I to IV being designated $R_1$ to $R_7$ and having respective values as specified in the table of mathematical statements herebelow, the minus (−) sign used with the R designations signifying those surfaces which have their centers of curvature lying on the entrant side of the vertex of said surfaces, the object distance from the specimen to the first lens vertex being designated $S_1$, the axial air spaces between lenses I and II, and between lens II and doublet lens V being respectively designated $S_2$ and $S_3$, and $S_4$ designating the axial distance from the rearmost lens V to the image plane, the air spaces having values substantially as given in said table, and the values of the lens thicknesses $t_1$ to $t_4$ of the successive lens elements I to IV respectively being stated in said table, $-R_1 = .1872F$   $S_1 = .571F$
$-R_2 = .863F$   $S_2 = .221F$
$-R_3 = .516F$   $S_3 = .01073F$
$-R_4 = .488F$   $S_4 = 5.62F$
$R_5 = .653F$   $t_1 = .0857F$
$R_6 = .308F$   $t_2 = .0802F$
$-R_7 = .536F$   $t_3 = .0487F$
          $t_4 = .1286F$ the values for the focal lengths $-F_I$, $F_{II}$ and $F_V$ of said lenses I, II and V respectively being substantially .483F, 5.69F and .735F respectively, wherein F represents the equivalent focal length of said objective.

2. A microscope objective of low power reversed telephoto type having a numerical aperture of substantially .09 and being corrected for spherical and chromatic aberrations, astigmatism, coma and field curvature, said objective comprising a negative meniscus singlet lens which is concave toward the entrant side of said objective and is designated I, a positive meniscus singlet lens designated II which is concave toward lens I and is spaced rearwardly therefrom, a positive doublet lens member spaced rearwardly from lens II and designated V, said doublet member being composed of a front convex-concavo meniscus lens designated III which is in contact with a rearward double convex lens designated IV, the radii of curvature for the successive lens surfaces of lenses I to IV being designated $R_1$ to $R_7$ and having respective values as specified in the table of mathematical statements herebelow, the minus (−) sign used with the R designations signifying those surfaces which have their centers of curvature lying on the entrant side of the vertex of said surfaces, the object distance from the specimen to the first lens vertex being designated $S_1$, the axial air spaces between lenses I and II, and between lenses II and III being respectively designated $S_2$ and $S_3$ and having values as given in said table, $S_4$ designating the axial distance from the rearmost lens V to the image plane, and the values of the lens thicknesses $t_1$ to $t_4$ of the successive lens elements I to IV respectively being stated in said table, $-R_1 = .1872F$   $S_1 = .571F$
$-R_2 = .863F$   $S_2 = .221F$
$-R_3 = .516F$   $S_3 = .01073F$
$-R_4 = .488F$   $S_4 = 5.62F$
$R_5 = .653F$   $t_1 = .0857F$
$R_6 = .308F$   $t_2 = .0802F$
$-R_7 = .536F$   $t_3 = .0487F$
          $t_4 = .1286F$ wherein F represents the equivalent focal length of said objective, the specific values for refractive index $n_D$ and Abbe number $\nu$ of the glasses in lenses I to IV for one form of the invention being substantially,

| Lenses | $n_D$ | $\nu$ |
|---|---|---|
| I | 1.517 | 64.5 |
| II | 1.720 | 29.3 |
| III | 1.720 | 29.3 |
| IV | 1.517 | 64.5 |

3. A microscope objective of low power reversed telephoto type characterized by a numerical aperture value of substantially 0.09, further characterized by excellent correction for spherical and chromatic aberrations, astigmatism, coma, and field curvature, said objective comprising

- a negative meniscus singlet lens which is concave toward the entrant side of the objective and is designated I,
- a positive meniscus singlet lens designated II which is concave toward lens I and is spaced rearwardly therefrom, and
- a positive doublet lens member spaced rearwardly from lens II and designated V, said doublet member being composed of a front convex-concavo meniscus lens designated III which lies in contact with a rearward double convex lens designated IV, the constructional data for said objective being given in the chart herebelow wherein the successive lens surface radii are designated $R_1$ to $R_7$ numbered from the specimen side of the objective, the focal lengths of the successive lenses being designated $F_1$ to $F_4$, the successive thicknesses of said lenses being designated $t_1$ to $t_4$, the successive air spaces between the specimen plane and image plane being designated $S_1$ to $S_4$, and the refractive index and Abbe number of the lens materials being designated $n_D$ and $\nu$ respectively, the minus (—) sign applying to those lens surfaces which have their centers of curvature lying on the specimen side of the vertices of said surfaces, Magnification=3.5X.   Numerical Aperture=.09.   E.F.L.=35.01

| Lens | Focal Length | Radii | Thickness | Spaces | $n_D$ | $\nu$ |
|---|---|---|---|---|---|---|
| I | $F_1=-16.8971$ | $-R_1=6.5464$ | $t_1=3.0$ | $S_1=20.03$ | 1.517 | 64.5 |
|  |  | $-R_2=30.20$ |  | $S_2=7.75$ |  |  |
| II | $F_2=199.5411$ | $-R_3=18.030$ | $t_2=2.8$ |  | 1.720 | 29.3 |
|  |  | $-R_4=17.061$ |  | $S_3=.375$ |  |  |
| III | $F_3=-29.9607$ | $R_5=22.909$ | $t_3=1.7$ |  | 1.720 | 29.3 |
| IV | $F_4=13.9420$ | $R_6=10.765$ | $t_4=4.5$ |  | 1.517 | 64.5 |
|  |  | $-R_7=18.707$ |  | $S_4=196.55$ |  |  |

Scalar quantities given in millimeters.

References Cited by the Examiner

UNITED STATES PATENTS 2,206,155    7/1940    Boegehold _____ 88—57

JEWELL H. PEDERSEN, *Primary Examiner.*

JOHN K. CORBIN, *Examiner.*

R. J. STERN, *Assistant Examiner.*